(12) United States Patent
Satoh et al.

(10) Patent No.: US 11,225,557 B2
(45) Date of Patent: Jan. 18, 2022

(54) METHOD FOR PRODUCING MOLDED ARTICLE

(71) Applicant: DAIKIN INDUSTRIES, LTD., Osaka (JP)

(72) Inventors: Kazuyuki Satoh, Osaka (JP); Mitsuhiro Usugaya, Osaka (JP); Kenji Adachi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 126 days.

(21) Appl. No.: 16/082,441

(22) PCT Filed: Mar. 6, 2017

(86) PCT No.: PCT/JP2017/008757
§ 371 (c)(1),
(2) Date: Sep. 5, 2018

(87) PCT Pub. No.: WO2017/154829
PCT Pub. Date: Sep. 14, 2017

(65) Prior Publication Data
US 2019/0085137 A1 Mar. 21, 2019

(30) Foreign Application Priority Data

Mar. 9, 2016 (JP) .............................. JP2016-045912

(51) Int. Cl.
C08J 3/28 (2006.01)
C08J 3/12 (2006.01)
C08F 255/00 (2006.01)
C08F 259/08 (2006.01)

(52) U.S. Cl.
CPC ............... *C08J 3/28* (2013.01); *C08F 255/00* (2013.01); *C08F 259/08* (2013.01); *C08J 3/12* (2013.01); *C08J 3/126* (2013.01)

(58) Field of Classification Search
None
See application file for complete search history.

(56) References Cited

U.S. PATENT DOCUMENTS

| 4,506,035 | A | 3/1985 | Barnett et al. |
| 5,756,199 | A | 5/1998 | Kerbow et al. |
| 2004/0059015 | A1 | 3/2004 | MacKinnon |
| 2008/0045108 | A1 | 2/2008 | Masuda |

FOREIGN PATENT DOCUMENTS

| GB | 1516648 | A | | 7/1978 | |
| JP | 58-501038 | A | | 6/1983 | |
| JP | 10-503236 | A | | 3/1998 | |
| JP | 2001-172338 | A | | 6/2001 | |
| JP | 2006-037085 | A | | 2/2006 | |
| JP | 2006-045251 | A | | 2/2006 | |
| JP | 2009019185 | A | * | 1/2009 | ............ C08F 255/02 |
| JP | 2010080743 | A | * | 4/2010 | |
| WO | 83/00157 | A1 | | 1/1983 | |
| WO | 96/03448 | A1 | | 2/1996 | |
| WO | 2015/152310 | A1 | | 10/2015 | |

OTHER PUBLICATIONS

International Search report of PCT/JP2017/008757 filed May 30, 2017.
International Preliminary Report on Patentability dated Sep. 20, 2018 from the International Bureau in counterpart International Application No. PCT/JP2017/008757.
Communication dated Oct. 10, 2019 from the European Patent Office in corresponding application No. 17763169.4.

* cited by examiner

*Primary Examiner* — Sanza L. McClendon
(74) *Attorney, Agent, or Firm* — Sughrue Mion, PLLC

(57) ABSTRACT

A method for producing a molded article from a molding material, wherein the molding material contains a fluorine-containing graft chain. Also disclosed is a molding material for a fluorine-containing molded article including a resin material having a graft chain.

13 Claims, No Drawings

METHOD FOR PRODUCING MOLDED ARTICLE

This application is a National Stage of International Application No. PCT/JP2017/008757 filed Mar. 6, 2017, claiming priority based on Japanese Patent Application No. 2016-045912 filed Mar. 9, 2016.

TECHNICAL FIELD

The present invention relates to a method for producing a molded article and, more particularly, to a method for producing a resin molded article from a molding material having a fluorine-containing graft chain.

BACKGROUND ART

A resin molded article is used in various fields such as fields of medical members, optical members, construction members, cloths, packages, containers, and molds. Various functions such as water repellency and oil repellency are imparted to the resin molded article in accordance with the use thereof.

Conventionally, as a method of imparting the functions such as water repellency and oil repellency to the resin molded article, a method has been known, in which a fluorine is segregated on the surface of an obtained molded article by adding a fluorine-based repellent agent when molding is conducted (Patent Document 1) or in which a radical is generated by applying an ionizing radiation to the surface of a molded article after the molding and then grafting a fluorine-containing monomer (Patent Document 2).

PRIOR ART DOCUMENTS

Patent Documents

Patent Document 1: Japanese Laid-Open Patent Publication No. 2006-37085
Patent Document 2: WO 2015-152310

SUMMARY OF THE INVENTION

Problems to be Solved by the Invention

In the conventional method of adding a fluorine-based repellent agent when molding is conducted, problems may arise such as the one that the added fluorine-based repellent agent bleeds out and white turbidity is generated, and the like. With the method of grafting the surface of the molded article after the molding, problems may arise that unevenness tends to be generated on the surface and that operation is complicated.

An object of the present invention is to provide a production method to obtain a molded article that has no bleed-out generated thereon and that has an even surface.

Means to Solve the Problem

The inventors actively have studied to solve the above object and, as a result, have found that, before molding the raw material of the molded article, that is, the molding material have been graft-treated, and then the molding was conducted, and, as a result, a molded article having no bleed-out generated therein and having no unevenness on its surface have been able to be obtained by a simple operation. The inventors have completed the present invention.

The Present Invention Provides
[1] a method for producing a molded article from a molding material, wherein the molding material comprises a fluorine-containing graft chain;
[2] the method according to [1], further comprising obtaining the molding material by applying an ionizing radiation to a resin material and then reacting the resin material with a fluorine-containing graft compound;
[3] the method according to [1] or [2], wherein the molding material is a pellet;
[4] the method according to [1] or [2], wherein the molding material is powder;
[5] a molding material for a fluorine-containing molded article, comprising a resin material having a graft chain;
[6] the molding material according to [5], wherein the molding material is a pellet; and
[7] the molding material according to [5], wherein the molding material is powder.

Effect of the Invention

According to the method of the present invention, any degradation of the water repellency and the oil repellency over time can be prevented that is caused by a bleed-out phenomenon that traditionally occurs when a specific fluorine-containing polymer is melted and kneaded with a thermoplastic resin to form a molded article and thereby a fluorine compound is segregated on the surface of the molded article. Occurrence of any bleed-out can be prevented and a molded article having an even surface can be produced by conducting molding using a molding material into which a fluorine-containing graft chain is introduced.

EMBODIMENTS TO CARRY OUT THE INVENTION

A method for producing a molded article of the present invention will be described below in detail.

A molding material used in the method of the present invention is a material having a fluorine-containing graft chain on the resin material.

The molding material is a material used to mold a resin molded article and has, depending on the molding method, a relatively small size.

The molding material has a surface area of preferably 600 $mm^2$ or smaller, more preferably 400 $mm^2$ or smaller, further preferably 300 $mm^2$ or smaller, and further more preferably 150 $mm^2$ or smaller such as, for example, 100 $mm^2$ or smaller, or 80 $mm^2$ or smaller. The molding material has the surface area of preferably 0.1 $mm^2$ or larger, more preferably 1.0 $mm^2$ or larger, further preferably 2.0 $mm^2$ or larger, and further more preferably 10.0 $mm^2$ or larger such as, for example, 30.0 $mm^2$ or larger, or 50.0 $mm^2$ or larger.

The molding material has a volume of preferably 800 $mm^3$ or smaller, more preferably 500 $mm^3$ or smaller, further preferably 300 $mm^3$ or smaller, and further more preferably 200 $mm^3$ or smaller such as, for example, 100 $mm^3$ or smaller, or 80 $mm^3$ or smaller. The molding material has the volume of preferably 0.01 $mm^3$ or larger, more preferably 0.5 $mm^3$ or larger, further preferably 1.0 $mm^3$ or larger, and further more preferably 5.0 $mm^3$ or larger such as, for example, 20.0 $mm^3$ or larger, or 30 $mm^3$ or larger.

The handling of the molding material becomes easier by setting the size of the molding material to be larger. On the other hand, the molding process becomes easier by setting the size of the molding material to be smaller.

The shape of the molding material is not particularly limited even if the shape is a form suitable for molding a molded article and the form may be, for example, powder, particles, chips, or pellets.

The "powder" (or "a powder material") as used herein refers to, for example, powder whose average particle diameter is 0.1 to 500 μm and preferably 1.0 to 300 μm such as, for example, 10 to 200 μm or 30 to 100 μm.

The "particles" herein refers to particles whose average particle diameter is, for example, 500 to 1,000 μm and preferably 60 to 800 μm.

The "pellets" herein each have, for example, a spherical, a prolate spherical, a flattened spherical, a bar-like, a plate-like, or a block-like shape, or any optional shape similar to any one of these which have the maximum diameter of 0.8 to 8.0 mm, preferably 1.2 to 5.0 mm, and more preferably, 1.5 to 3.0 mm.

The "chips" herein each have, for example, a spherical, a prolate spherical, a flattened spherical, a bar-like, a plate-like, or a block-like shape, or any optional shape similar to any one of these which have the maximum length of 8.0 to 20 mm and preferably 10 to 15 mm.

In an embodiment, the molding material is powder, a pellet, or a mixture of these.

In a preferred embodiment, the molding material is powder.

In another preferred embodiment, the molding material is a pellet.

In a yet another preferred embodiment, the molding material is a mixture of powder and pellets.

The "fluorine-containing graft chain" is a branch chain branched from a main polymer chain of the resin material, and may be the one formed by covalently-bonding the fluorine-containing graft compound descried below to the main polymer chain.

The fact that "the surface of the molding material has the fluorine-containing graft chain" can be confirmed by conducting an element analysis for the surface (up to a depth of, for example, 0.1 μm) of the molding material. For example, an X-ray photon electron spectroscopy (XPS) or an attenuated total reflection (ATR) is usable as the method for the element analysis.

The molding material has the fluorine-containing graft chain in at least its surface. The fluorine-containing graft chain is present at a depth of 20 mm at a maximum, preferably 1 mm at a maximum, more preferably up to 500 μm at a maximum, and further preferably up to 200 μm at a maximum from the surface of the molding material. The fluorine-containing graft chain is present up to a depth of preferably 100 μm at a maximum, up to a depth of more preferably 40 μm at a maximum, and up to a depth of further preferably 20 μm at a maximum therefrom. The graft chain is present preferably at a depth of at least 0.2 μm, more preferably at a depth of at least 1 μm, and further preferably up to a depth of at least 3 μm, for example, up to a depth of 10 μm, up to a depth of 50 μm, or up to a depth of 100 μm from the surface of the molding material. For example, the graft chain is present up to a depth of 0.2 to 20 mm, up to a depth of 0.2 to 1 mm, up to a depth of 0.2 to 500 μm, up to a depth of 0.2 to 200 μm, up to a depth of 1 to 100 μm, up to a depth of 3 to 40 μm, or up to a depth of 10 to 20 μm from the surface of the molding material. The desired functions are more improved that develop for the obtained molded article as the thickness having the fluorine-containing graft chain present therein becomes larger. The strength of each of the molding material and the obtained molded article is more improved as the thickness having the fluorine-containing graft chains present therein becomes smaller.

The depth at which the fluorine-containing graft chain is present may preferably be a depth up to 0.001 to 99% of the thickness of the molding material from the surface of the molding material, for example, a depth up to 0.01 to 99% thereof or a depth up to 0.1 to 99% thereof. The depth at which the fluorine-containing graft chain is present may also be preferably a depth up to 1 to 95%, more preferably 3 to 90%, more preferably a depth up to 5 to 80%, further preferably a depth up to 10 to 60%, and further more preferably a depth up to 20 to 60% from the surface of the molding material.

The depth at which the fluorine-containing graft chain is present can be measured for the cross-section of the molding material obtained after the surface graft polymerization by using an energy dispersive X-ray (EDX) analysis by a scanning electron microscope (SEM), an electron probe micro-analyzer (EPMA) analysis, a scanning transmission electron microscope (STEOM), or the like. The depth at which the fluorine-containing graft chain is present can also be measured using a microscopic FT-IR, a Raman microscope, or the like.

The depth at which the fluorine-containing graft chain is present in the molding material obtained after the graft polymerization can also be measured by using a positron lifetime measurement. The positron lifetime obtained by measuring the time period from generation of a positron to its pair annihilation with an electron is correlated with the amorphous free volume of a polymer and the size of an atomic vacancy in the crystal. The amorphous free volume of the molding material therefore becomes smaller and the positron lifetime also becomes shorter as the polymer is more grafted with the graft chain. From this fact, the depth at which the graft chain is present can be measured by using the positron lifetime measurement. According to the positron lifetime measurement, in general, a gamma ray and an annihilation gamma ray radiated when β+ decay takes place are each detected by a scintillation detector different from that of each other and, from the time difference between their injections, the frequency of positrons annihilating in a certain time period is counted. The positron lifetime can be determined by analyzing the decay curve obtained as above. For example, in "Free volume study of the functionalized fluorinated polymer" by T Oka, presented in The 2nd Japan-China Joint Workshop on Positron Science (JWPS 2013), an example where styrene is grafted into a fluorine-containing resin is introduced. In the present invention, the presence of the graft chains can also be measured using this method.

The molding material of the present invention may have the graft ratio of preferably 0.001 to 150%, more preferably 0.01 to 150%, further preferably 0.05 to 100%, and further more preferably 0.10 to 50% such as, for example, 0.10 to 10%, 0.20 to 10%, or 0.20 to 5.0%.

The "graft ratio" means the ratio of the graft chain introduced into the resin material. In particular, the graft ratio (Dg) can be calculated in accordance with the equation below after measuring the variation of the weight between the resin material before the graft polymerization reaction and the molding material after the graft polymerization reaction.

$$\text{Graft Ratio: } Dg\ [\%] = (W_1 - W_0)/W_0 \times 100$$

wherein "$W_0$" is the weight of the resin material before the graft polymerization and "$W_1$" is the weight of the molding material after the graft polymerization.

The graft ratio can also be calculated based on a thermogravimetric analysis (TG). For example, using the molding material comprising the graft chain, the temperature of the molding material is varied in accordance with a specific program (by heating or cooling), the variation of the weight of the molding material is measured, and the graft ratio can be calculated from this weight variation. The thermogravimetric measurement can be conducted, for example, by using a TGA measuring device manufactured by Rigaku Co., Ltd., or by Shimadzu Corp.

Examples of the method for introducing the fluorine-containing graft chain into the resin material include, for example, a method in which the resin material is treated by using an ionizing radiation and then the resin material treated is reacted with a fluorine-containing graft compound described below. A hydrogen atom or a fluorine atom is desorbed from the compound constructing the resin material or the main chain, or the main chain and/or a side chain of the compound constructing the resin material is cut by a radiation chemical reaction to generate radicals, in the resin material, by applying the ionizing radiation to the resin material. These radical is surface graft-polymerized with a fluorine compound that imparts the functions to the resin material (hereinafter, referred to as "fluorine-containing graft compound") to introduce the fluorine-containing graft chains into the resin material.

In an embodiment, the method of the present invention may therefore further comprise the molding material is obtained by applying an ionizing radiation to the resin material and then reacted with the fluorine-containing graft compound.

The resin constituting the resin material is not particularly limited while this resin may be a resin such as, for example, a non-fluorine resin (otherwise referred to as "general-purpose resin") or a fluorine resin that does not have any desired function such as, for example, the antifouling property, the water repellency, and the oil repellency, or that does not have sufficient desired functions.

The non-fluorine resin is not particularly limited as long as the non-fluorine resin is a resin into which the graft chain can be introduced, for example, a resin capable of generating radical by application of an ionizing radiation thereto when the graft chain is introduced by using the ionizing radiation described below. Examples of the non-fluorine resin include, for example, polyolefin-based resins such as polyethylene, polypropylene, ethylene-propylene copolymer, and ethylene-vinyl acetate copolymer (EVA), cycloolefin resins, polyvinyl chloride-based resins such as modified polyolefin and polyvinyl chloride, acrylic resins such as polyvinylidene chloride, polystyrene, polyamide, polyimide, polyamideimide, polycarbonate, poly-(4-methylpentene-1), ionomer, and polymethylmethacrylate (PMMA), polyesters such as acrylstyrene copolymer (AS resin), butadiene-styrene copolymer, ethylene-vinyl alcohol copolymer (EVOH), polyethylene terephthalate (PET), polybutylene terephthalate (PBT), and polycyclohexane terephthalate (PCT), polyether, polyether ketone (PEK), polyetherether ketone (PEEK), polyetherimide, polyacetal (POM), polyphenyleneoxide, modified polyphenyleneoxide, polyarylate, aromatic polyesters (liquid crystal polymers), styrene-based resins, polyurethane-based resins, chlorinated polyethylene-based resins, epoxy resins, phenol resins, urea resins, melamine resins, unsaturated polyesters, silicone resins, polydimethyl silicone (PDMS), and polyurethane, or copolymers, blends, polymer alloys, and the like each including these. Among these, cycloolefin resins, polyethylene, and polypropylene are advantageously used because these can each have the functions such as the antifouling property, the water repellency, and the oil repellency imparted to their surfaces.

Examples of the fluorine resin include ethylene-tetrafluoroethylene copolymer (ETFE), vinylidene fluoride-hexafluoropropylene-tetrafluoroethylene copolymer (FKM), polytetrafluoroethylene, tetrafluoroethylene-hexafluoropropylene copolymer (FEP), perfluoroalkoxy copolymer (PFA), ethylene-chlorotrifluoroethylene copolymer (ECTFE), polyvinyl fluoride (PVF), polyvinylidene fluoride (PVDF), polychlorotrifluoroethylene (PCTFE), vinylidene fluoride-hexafluoropropylene copolymer (VdF-HFP), vinylidene fluoride-tetrafluoroethylene-hexafluoropropylene copolymer (VdF-TFE-HFP), other fluorine-based resins, and fluorine rubbers and, in addition, may include blend resins and polymer alloys of the above. Among these, ETFE can have the function of the slipperiness imparted thereto in addition to the antifouling property, the water repellency, the oil repellency, and the like, and is therefore advantageously used.

The fluorine-containing graft compound is not particularly limited as long as the fluorine-containing graft compound can be graft-polymerized with the resin material and can impart the desired functions to the resin material. Examples thereof include, for example, a compound including a portion that contains a fluorine atom and a portion that is reactive with a radical.

In an embodiment, the fluorine-containing graft compound may be a compound having a perfluoropolyether group or a perfluoroalkyl group, and a group reactive with a radical.

The perfluoropolyether group (hereinafter, also referred to as "PFPE") means a group represented by the formula below:

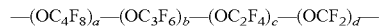

wherein a, b, c, and d are each independently an integer of 0 to 200, the sum of a, b, c, and d is at least 1, and the occurrence order of the respective repeating units in parentheses is not limited in the formula.

In the above formula, a, b, c, and d are each not particularly limited as long as a, b, c, and d are each independently an integer of 0, or an integer of 1 or more and the sum of a, b, c, and d is at least 1. Preferably, a, b, c, and d are each independently an integer of 0 to 200, for example, an integer of 1 to 200, more preferably an integer of 0 to 100, for example, an integer of 1 to 100. The sum of a, b, c, and d is further preferably 10 or more, preferably 20 or more, and 200 or less, and preferably 100 or less. The presence order of the repetition units in parentheses with a, b, c, or d is not limited in the formula.

Among these repeating units, "—($OC_4F_8$)—" may be any one of —($OCF_2CF_2CF_2CF_2$)—, —($OCF(CF_3)CF_2CF_2$)—, —($OCF_2CF(CF_3)CF_2$)—, —($OCF_2CF_2CF(CF_3)$)—, —($OC(CF_3)_2CF_2$)—, —($OCF_2C(CF_3)_2$)—, —($OCF(CF_3)CF(CF_3)$)—, —($OCF(C_2F_5)CF_2$)—, and —($OCF_2CF(C_2F_5)$)—, preferably —($OCF_2CF_2CF_2CF_2$)—. "—($OC_3F_6$)—" may be any one of —($OCF_2CF_2CF_2$)—, —($OCF(CF_3)CF_2$)—, and —($OCF_2CF(CF_3)$)—, preferably —($OCF_2CF_2CF_2$)—. "—($OC_2F_4$)—" may be either —($OCF_2CF_2$)— or —($OCF(CF_3)$)— preferably —($OCF_2CF_2$).

In an embodiment, PFPE is —(OC$_3$F$_6$)$_b$— wherein b is an integer of 1 to 200 and preferably 10 to 100 and is preferably —(OCF$_2$CF$_2$CF$_2$)$_b$— wherein b has the same meaning as above.

In an another embodiment, PFPE is —(OC$_4$F$_8$)$_a$—(OC$_3$F$_6$)$_b$—(OC$_2$F$_4$)$_c$—(OCF$_2$)$_d$— (wherein a and b are each independently an integer of 0 or 1 to 30 and preferably 0 to 10, c and d are each independently an integer of 1 to 200 and preferably 10 to 100, the sum of a, b, c, and d is 10 or more, preferably 20 or more, and 200 or less, preferably 100 or less, and the presence order of the respective repeating units in parentheses with the subscript a, b, c, or d is not limited in the formula), preferably —(OCF$_2$CF$_2$CF$_2$CF$_2$)$_a$—(OCF$_2$CF$_2$CF$_2$)$_b$—(OCF$_2$CF$_2$)$_b$—(OCF$_2$)$_d$— (wherein a, b, c, and d are as defined above). For example, PFPE may be —(OCF$_2$CF$_2$)$_c$—(OCF$_2$)$_d$— wherein c and d are as defined above.

In a further another embodiment, PFPE is a group represented by "—(OC$_2$F$_4$—R$^{11}$)$_b$—". In the formula, R$^{11}$ is a group selected from OC$_2$F$_4$, OC$_3$F$_6$, and OC$_4$F$_8$, or a combination of two or three groups each independently selected from these groups. The combination of two or three groups each independently selected from OC$_2$F$_4$, OC$_3$F$_6$, and OC$_4$F$_8$ include, but is not particularly limited, for example, —OC$_2$F$_4$OC$_3$F$_6$—, —OC$_2$F$_4$OC$_4$F$_8$—, —OC$_3$F$_6$OC$_2$F$_4$—, —OC$_3$F$_6$OC$_3$F$_6$—, —OC$_3$F$_6$OC$_4$F$_8$—, —OC$_4$F$_8$OC$_4$F$_8$—, —OC$_4$F$_8$OC$_3$F$_6$—, —OC$_4$F$_8$OC$_2$F$_4$—, —OC$_2$F$_4$OC$_2$F$_4$OC$_3$F$_6$—, —OC$_2$F$_4$OC$_2$F$_4$OC$_4$F$_8$—, —OC$_2$F$_4$OC$_3$F$_6$OC$_2$F$_4$—, —OC$_2$F$_4$OC$_3$F$_6$OC$_3$F$_6$—, —OC$_2$F$_4$OC$_4$F$_8$OC$_2$F$_4$—, —OC$_3$F$_6$OC$_2$F$_4$OC$_2$F$_4$—, —OC$_3$F$_6$OC$_2$F$_4$OC$_3$F$_6$—, —OC$_3$F$_6$OC$_3$F$_6$OC$_2$F$_4$—, and —OC$_4$F$_8$OC$_2$F$_4$OC$_2$F$_4$—. "n" is an integer of 2 to 100 and preferably 2 to 50. In the above formulae, OC$_2$F$_4$, OC$_3$F$_6$, and OC$_4$F$_8$ may each be either a straight chain or a branched chain, and is preferably a straight chain. In this embodiment, PFPE is preferably —(OC$_2$F$_4$—OC$_3$F$_6$)$_n$—, —(OC$_2$F$_4$—OC$_3$F$_6$OC$_3$F$_6$)$_n$—, or —(OC$_2$F$_4$—OC$_4$F$_8$)$_n$—.

In an embodiment, a unit (4) has 1 to 3 groups (α) consisting of at least one of oxyperfluoroalkylene group having 1 to 2 carbon atoms, and 1 to 3 group (β) consisting of at least one of oxyperfluoroalkylene group having 3 to 6 carbon atoms, and the perfluoro(poly)ether group may be a group having a chain ((αβ)$_n$) formed by linking the 2 or more units (αβ) to each other.

The above compound may comprise another oxyperfluoroalkylene group that does not belong to the chain ((αβ)$_n$).

Order of the group (α) and the group (β) in the unit (αβ) is not particularly limited. For example, when two groups (α) are present, the two groups (α) may be linked to each other or may be bonded to each other through at least the one group (β) therebetween.

The perfluoro(poly)ether group may include a chain ((αβ)$_n$) formed by linking the two or more units (αβ) to each other. When one end portion of the unit (αβ) is the group (α) and the other end portion is the group (β), it is preferred that the two or more units (αβ) be linked to each other for the group (α) and the group (β) to be alternately arranged between the units, as the chain ((αβ)$_n$). It is preferred that the adjacent units (αβ) be bonded to each other to form a head-tail structure (a head to tail structure).

An preferred embodiment of the perfluoro(poly)ether group is represented by, for example, a formula (1) below.

Rf-O-[(Rf$^1$O)$_{×1}$(Rf$^2$O)$_{×2}$(Rf$^3$O)$_{×3}$(Rf$^4$O)$_{×4}$(Rf$^5$O)$_{×5}$(Rf$^6$O)$_{×6}$]$_n$—B   (1)

The symbols in the formula (1) are as follows.

n: An integer of 2 or greater.

×1 to ×2: These are each independently an integer of 0 to 3 and ×1+×2 is an integer of 1 to 3.

×3 to ×6: These are each independently an integer of 0 to 3 and ×3+×4+×5+×6 is an integer of 1 to 3.

Rf$^1$: A perfluoroalkylene group having 1 carbon atom.

Rf$^2$: A perfluoroalkylene group having 2 carbon atoms.

Rf$^3$: A perfluoroalkylene group having 3 carbon atoms.

Rf$^4$: A perfluoroalkylene group having 4 carbon atoms.

Rf$^5$: A perfluoroalkylene group having 5 carbon atoms.

Rf$^6$: A perfluoroalkylene group having 6 carbon atoms.

Rf: A perfluoroalkyl group having 1 to 6 carbon atom(s), a perfluoroalkyl group having 2 to 6 carbon atoms and having an etheric oxygen atom.

"n" is an integer of 1 or more. The upper limit of n is preferably 45. n is preferably 4 to 40 and especially preferably 5 to 35.

For the unit (αβ), the bonding order for the group (α) and the group (β) is not limited. The groups (α) and the groups (β) may randomly be arranged or the group (α) and the group (β) may alternately be arranged, and two or more blocks each including a plurality of groups may be linked to each other.

The followings are exemplified as the unit (αβ).

(CF$_2$CF$_2$O—CF$_2$CF$_2$CF$_2$O), (CF$_2$CF$_2$O—CF$_2$CF$_2$CF$_2$CF$_2$O), (CF$_2$CF$_2$O—CF$_2$CF$_2$CF$_2$OCF$_2$CF$_2$CF$_2$O), (CF$_2$CF$_2$O—CF$_2$CF(CF$_3$)OCF$_2$CF$_2$CF$_2$O), and (CF$_2$CF$_2$O—CF$_2$CF$_2$CF$_2$CF$_2$OCF(CF3)CF$_2$O).

The perfluoroalkyl group is a group represented by C$_n$F$_{2n+1}$ (n is an integer of 1 to 30 and preferably an integer of 3 to 20, for example, an integer of 5 to 10). The perfluoroalkyl group may be a straight chain or may be a branch chain, and is preferably a straight chain.

Examples of the portion reactive with the radical include, but are not particularly limited, for example, a group having an ethylenic double bond, an oxygen-containing cyclic group (for example, a glycidyl group and an oxetanyl group), and derivatives of these.

An preferable group reactive with the radical is a group represented by the formulae below:

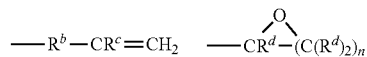

wherein R$^b$ is a bond or —OC(O)—,

R$^c$ represents a hydrogen atom, a fluorine atom, or an alkyl group having 1 to 10 carbon atoms optionally substituted by a fluorine atom (preferably an alkyl group having 1 to 3 carbon atoms and more preferably a methyl group) or a phenyl group, preferably a methyl group or a hydrogen atom, R$^d$ each independently represent a hydrogen atom, a fluorine atom, or an alkyl group having 1 to 10 carbon atoms optionally substituted by a fluorine atom (preferably an alkyl group having 1 to 3 carbon atoms and more preferably a methyl group) or a phenyl group, preferably a methyl group or a hydrogen atom and more preferably a hydrogen atom, and n is an integer of 1 to 5, preferably 1 or 2, and more preferably 1.

A preferable group reactive with the radical is a group represented by the formula below:

$$—R^b—CR^c=CH_2$$

wherein $R^b$ is a bond, —O—, —CO—, or —OC(O)—, $R^c$ represents a hydrogen atom, a fluorine atom, or an alkyl group having 1 to 10 carbon atoms optionally substituted by a fluorine atom (preferably an alkyl group having 1 to 3 carbon atoms, more preferably a methyl group), a lactam group (preferably a β-lactam, a γ-lactam, or a δ-lactam group, more preferably the γ-lactam group) or a phenyl group, preferably a methyl group or a hydrogen atom.

A more preferable group reactive with the radical is a group represented by the formula below:

$$—OC(O)—CR^c=CH_2$$

wherein $R^c$ is as defined above.

A further preferable group reactive with the radical is an acryloyl group or a methacryloyl group.

Examples of the fluorine-containing graft compound are not limited and include, for example, at least one compound represented by any one of formulae below (A1), (A2), (B1), (B2), and (C1):

$$Rf\text{-PFPE-X}R^1 \quad (A1)$$

$$R^1\text{-X-PFPE-X-}R^1 \quad (A2)$$

$$Rf\text{-PFPE-}R^2—R^3—(R^4)_{n1}—R^5—R^6 \quad (B1)$$

$$R^6—R^5—(R^4)_{n1}—R^3R^2\text{-PFPE-}R^2—R^3—(R^4)_{n1}—R^5—R^6 \quad (B2)$$

$$R^7(Rf\text{-PFPE-}R^2)_{n2}(R^8—R^1)_{n3} \quad (C1)$$

$$R^7(Rf\text{-PFPE-}R^2)_{n2}(R^9(R^1)_{n4})_{n3} \quad (D1)$$

$$R^7(Rf\text{-PFPE-}R^2)_{n5}(R^{11})_{n5}R^{12})_{n7} \quad (E1)$$

wherein "Rf" each independently represents an alkyl group having 1 to 16 carbon atoms optionally substituted by one or more fluorine atoms, PFPE is as defined above, "$R^1$" each independently represents a group reactive with the radical, X represents a divalent organic group, $R^2$ is a group represented by a formula below:

$$-(Q)_e\text{-}(CFZ)_f—(CH_2)_g—$$

wherein Q each independently at each occurrence represents an oxygen atom, phenylene, carbazolylene, —$NR^a$— (wherein $R^a$ represents a hydrogen atom or an organic group), or a divalent polar group, Z each independently at each occurrence represents a hydrogen atom, a fluorine atom, or a lower fluoroalkyl group, e, f, and g each independently represent an integer of 0 to 50, the sum of e, f, and g is at least 1, and the occurrence order of the respective repeating units in parentheses is optional in the formula.

"$R^3$" each independently represents a divalent organic group,

"$R^4$" each independently represents for each appearance thereof $R^{4a}$ or $R^{4b}$: at least one $R^4$ is $R^{4a}$, "$R^{4a}$" each independently at each occurrence represents a divalent organic group having a group reactive with the radical, "$R^{4b}$" each independently at each occurrence represents a divalent organic group not having any group reactive with the radical, "n1" each independently is an integer of 1 to 50, "$R^5$" each independently represents —O—, —S—, —NH—, or a single bond, "$R^6$" each independently represents a monovalent organic group or a hydrogen atom, $R^7$ represents an (n2+n3)-valent or an (n5+n6+n7)-valent organic group which may have a cyclic structure, a hetero atom, and/or a functional group, $R^8$ represents a divalent organic group, n2 is an integer of 1 to 3, n3 is an integer of 1 to 3, $R^9$ represents a 3 to 8-valent organic group, n4 is an integer of 2 to 7, $R^{11}$ is —$R^8$—$R^1$ or —$R^9(R^1)_{n4}$, $R^{12}$ is a group containing Si, n5 is an integer of 1 to 3, n6 is an integer of 1 to 3, and n7 is an integer of 1 to 3.

The "monovalent organic group" and the "divalent organic group" as used herein respectively mean a monovalent group and a divalent group each containing carbon.

In the above formulae (A1) and (A2), "$R^1$" each independently represents a group reactive with the radical.

$R^1$ is preferably a group represented by the formula below:

$$—R^b—CR^c=CH_2$$

wherein $R^b$ is a bond or —O—, —CO—, or —OC(O)—, $R^c$ represents a hydrogen atom, a fluorine atom, or an alkyl group having 1 to 10 carbon atoms that may be substituted by a fluorine atom (preferably an alkyl group having 1 to 3 carbon atoms, more preferably a methyl group), a lactam group (preferably a β-lactam, a γ-lactam, or a δ-lactam group, more preferably the γ-lactam group) or a phenyl group, preferably a methyl group or a hydrogen atom.

A more preferable group reactive with the radical is a group represented by the formula below $$—OC(O)—RR^c=CH_2$$

wherein $R^c$ is as defined above.

$R^1$ is further preferably an acryloyl group or a methacryloyl group.

In the above formulae (A1), (B1), and (C1), Rf represents an alkyl group having 1 to 16 carbon atoms optionally substituted by one or more fluorine atoms.

The "alkyl group having 1 to 16 carbon atoms" of the above alkyl group having 1 to 16 carbon atoms optionally substituted by one or more fluorine atoms may be a straight chain or may be a branch chain, preferably a straight chain or a branch chain alkyl group having 1 to 6 carbon atoms, preferably having 1 to 3 carbon atoms, more preferably a straight chain alkyl group having 1 to 3 carbon atoms.

Rf is preferably an alkyl group having 1 to 16 carbon atoms substituted by one or more fluorine atoms, more preferably, $CF_2H—C_{1-15}$ perfluoroalkylene group, further preferably a perfluoroalkyl group having 1 to 16 carbon atoms, further more preferably a perfluoroalkyl group having 1 to 6 carbon atoms, especially having 1 to 3 carbon atoms.

In the above formulae (A1) and (A2), "X" each independently represents a divalent organic group. The X group is understood to be a linker which links PFPE and $R^1$ to each other. The X group may therefore be any divalent organic group as long as compounds represented by (A1) and (A2) can stably be present.

Examples of the X are not particularly limited and, for example, the X is preferably a group represented by the formula below:

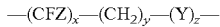

wherein Z represents a fluorine atom, or a perfluoroalkyl group having 1 to 3 carbon atoms or its derivative group, Y represents —OCO—, —OCONH—, —CONH—, or an organic group having one of these, x, y, and z each independently represent an integer of 0 to 3, and the occurrence order of the respective repeating units in parentheses with the subscript x, y, or x is not limited in the formula.

Specific examples of the X include, for example:
—$CF_2CF_2CH_2$—,
—$CF_2CF_2CH_2$—OCO—,
—$CF_2CF_2CH_2$—CONH—, and
—$CF_2CF_2CH_2$—OCONH—.

In the above formulae (B1) and (B2), $R^2$ is a group represented by a formula: -$(Q)_e$-$(CFZ)_f$—$(CH_2)_g$—. e, f, and g each independently represent an integer of 0 to 50, the sum of e, f, and g is at least 1, and the occurrence order of the respective repeating units in parentheses with the subscript is not limited in the formula.

In the above formula, Q represents an oxygen atom, phenylene, carbazolylene, —$NR^a$— (wherein $R^a$ represents a hydrogen atom or an organic group), or a divalent polar group, preferably an oxygen atom or a divalent polar group, more preferably an oxygen atom.

Examples of the "divalent polar group" in the Q include, but are not particularly limited to not particularly limited to, —C(O)—, —C(=$NR^e$)—, and —C(O)$NR^e$— (wherein $R^e$ represents a hydrogen atom or a lower alkyl group). The "lower alkyl group" is, for example, an alkyl group having 1 to 6 carbon atoms, for example, methyl, ethyl, or n-propyl, and these may each be substituted by one or more fluorine atoms.

In the above formulae, Z represents a hydrogen atom, a fluorine atom, or a lower fluoroalkyl group, preferably a fluorine atom.

The "lower fluoroalkyl group" is, for example, a fluoroalkyl group having 1 to 6 carbon atoms, preferably having 1 to 3 carbon atoms, preferably a perfluoroalkyl group having 1 to 3 carbon atoms, more preferably a trifluoromethyl group and a pentafluoroethyl group, further preferably a trifluoromethyl group.

$R^2$ is preferably a group represented by a formula: —$(O)_e$—$(CF_2)_f$—$(CH_2)_g$— wherein e, f, and g are as defined above, and the occurrence order of the respective repeating units is not limited the formula.

Examples of the group represented by the above formula: —$(O)_e$—$(CF_2)_f$—$(CH_2)_g$— include, for example, —$(O)_{e'}$—$(CF_2)_{f'}$—$(CH_2)_{g'}$—O—[$(CH_2)_{g''}$—O—]$_{g'''}$ wherein e' is 0 or 1, f', g', and g'' are each independently an integer of 1 to 10, and g''' is 0 or 1.

In the above formulae (B1) and (B2), $R^3$ represents a divalent organic group.

The $R^3$ group is preferably —$C(R^{3a})(R^{3b})$—. $R^{3a}$ and $R^{3b}$ each independently represent a hydrogen atom or an alkyl group, and one of $R^{3a}$ and $R^{3b}$ is preferably an alkyl group.

In the above formulae (B1) and (B2), "$R^4$" is each independently at each occurrence $R^{4a}$ or $R^{4b}$. At least one $R^4$ is $R^{4a}$.

"$R^{4a}$" each independently at each occurrence represents a divalent organic group having a group reactive with the radical.

$R^{4a}$ is preferably a group represented by the formula below:

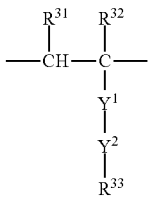

In the above formula, "$R^{31}$" each independently at each occurrence represents a hydrogen atom or an alkyl group. $R^{31}$ is preferably a hydrogen atom.

In the above formula, "$R^{32}$" each independently at each occurrence represents a hydrogen atom or an alkyl group. $R^{32}$ is preferably a methyl group or a hydrogen atom and more preferably a hydrogen atom.

In the above formula, "$R^{33}$" each independently at each occurrence represents an organic group having a group reactive with the radical.

Examples of the group reactive with the radical include the same group as above and the group is preferably $CH_2$=$CX^1$—C(O)— wherein $X^1$ represents a hydrogen atom, a halogen atom such as a chlorine atom, or an alkyl group having 1 to 10 carbon atoms optionally substituted by a fluorine atom or fluorine and examples thereof include $CH_2$=C($CH_3$)—C(O)— or $CH_2$=CH—C(O).

In the above formula, $Y^1$ represents —O—, —N($R^f$)—, phenylene, or carbazolylene. $R^f$ represents an organic group and is preferably an alkyl group.

$Y^1$ is preferably —O—, phenylene, or carbazolylene, more preferably —O— or phenylene, and further preferably —O—.

In the above formula, $Y^2$ represents a linker whose main chain has 1 to 16 atoms (more preferably 2 to 12, and further preferably 2 to 10). $Y^2$ is not particularly limited and examples thereof include —($CH_2$—$CH_2$—O)$_{p1}$— (p1 represents an integer of 1 to 10, for example, an integer of 2 to 10), —(CH$R^9$)$_{p2}$—O— (p2 is an integer of 1 to 40 and $R^9$ represents hydrogen or a methyl group), —($CH_2$—$CH_2$—O)$_{p3}$—CO—NH—$CH_2$—$CH_2$—O— (p3 represents an integer of 1 to 10, for example, an integer of 2 to 10), —$CH_2$—$CH_2$—O—$CH_2$—$CH_2$—, —($CH_2$)$_{p4}$— (p4 represents an integer f 1 to 6), —($CH_2$)$_{p5}$—O—CONH—($CH_2$)$_{p6}$— (p5 represent an integer of 1 to 8 and preferably 2 or 4, and p6 represents an integer of 1 to 6 and preferably 3), or —O— ($Y^1$ is not —O—). Examples of preferable $Y^2$ include —($CH_2$—$CH_2$—O)$_{p1}$— (p1 represents an integer of 1 to 10, for example, an integer of 2 to 10) or —(CH$R^d$)$_{p2}$—O— (p2 is an integer of 1 to 40 and $R^d$ represents hydrogen or a methyl group), for example, —($CH_2$—$CH_2$—O)$_2$— or —$CH_2$—$CH_2$—O—. These groups each have the left end thereof bonding to the main chain side of the molecule (the $Y^1$ side) and the right end thereof bonding to the side of the group reactive with the radical (the $R^{33}$ side).

$R^{4a}$ is more preferably a group represented by the formula below:

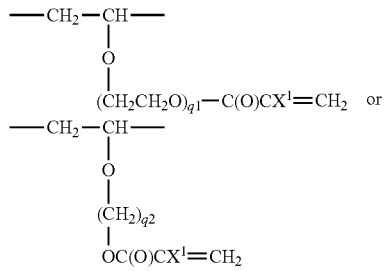

In the above formulae, $X^1$ represents a hydrogen atom, a halogen atom such as a chlorine atom, or an alkyl group having 1 to 10 carbon atoms optionally substituted by a fluorine atom or fluorine, preferably a hydrogen atom or an alkyl group having 1 to 10 carbon atoms, for example a methyl group. In the above formula, q1 is an integer of 1 to 10, preferably an integer of 1 to 5, for example, 1 or 2. q2 is an integer of 1 to 10 and preferably an integer of 1 to 5, for example, 2.

"$R^{4b}$" is each independently at each occurrence a divalent organic group not having any group reactive with the radical.

$R^{4b}$ is preferably $-(CHR^{4c}-CR^{4d}R^{4e})_s-$. $R^{4c}$ and $R^{4d}$ each independently represent a hydrogen atom or an alkyl group and s is an integer of 0 to 50, and the $R^{4e}$ group is -Q'-$R^{4f}$. Q' has the same meaning as that of above Q, $R^{4f}$ is an organic group not having any group reactive with the radical, and $R^{4q}$ described below is a group to be bonded to Q' through a linker or directly.

The linker is preferably
(a) $-(CH_2-CH_2-O)_{s1}-$ (s1 represents an integer of 1 to 10, for example, an integer of 2 to 10),
(b) $-(CHR^{4h})_{s2}-O-$ (s2 represents the number of replication to be an integer of 1 to 40 and $R^{4b}$ represents hydrogen or a methyl group),
(c) $-(CH_2-CH_2-O)_{s1}-CO-NH-CH_2-CH_2-O-$ (s1 is as defined above),
(d) $-CH_2-CH_2-O-CH_2-CH_2-$,
(e) $-(CH_2)_{s3}-$ (s3 represents an integer of 1 to 6), or
(f) $-(CH_2)_{s4}-O-CONH-(CH_2)_{s5}-$ (s4 represents an integer of 1 to 8 and preferably 2 or 4, and s5 represents an integer of 1 to 6 and preferably 3), or
(g) $-O-$ (Q' is not $-O-$).

$R^{4g}$ is preferably a group below.
(i) An alkyl group,
Examples: methyl, ethyl
(ii) A chainlike group having an alkyl group substituted by fluorine,

EXAMPLES

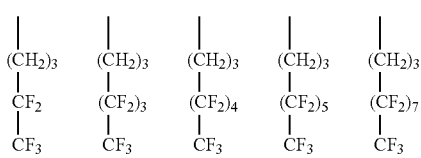

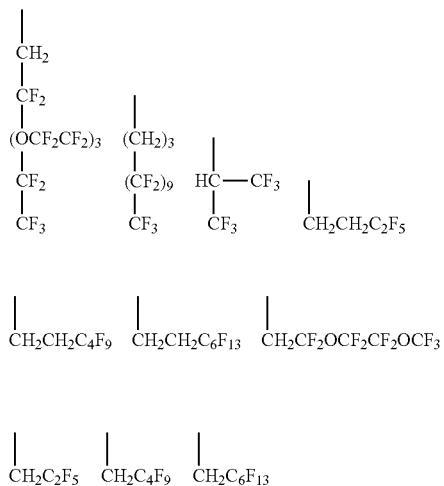

(iii) A group containing one or more cyclic parts selected from the group consisting of a monocyclic carbon ring, a bicyclic carbon ring, a tricyclic carbon ring, and a tetracyclic carbon ring,

EXAMPLES

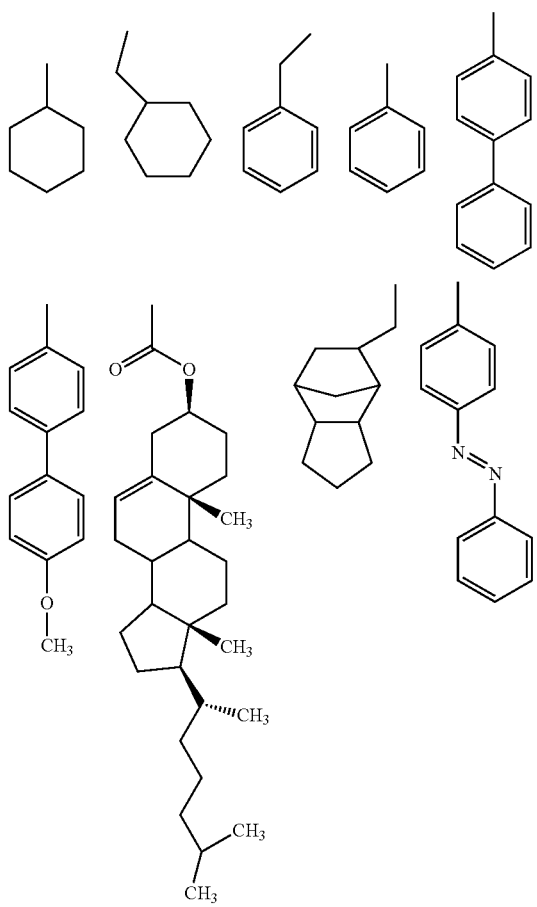

(iv) A group containing a hydrocarbon group substituted by one or more (preferably 1 or 2) carboxy groups,

EXAMPLES

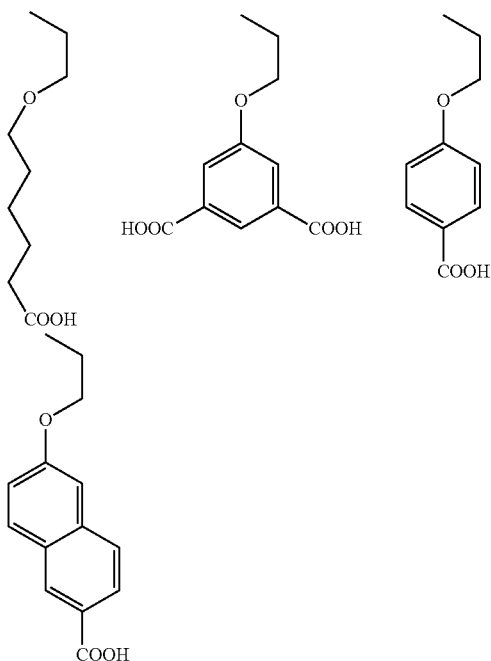

(v) A group containing one or more (preferably one) amino groups,
(vi) Hydrogen,
(vii) A group containing imidazolium salt,

EXAMPLES

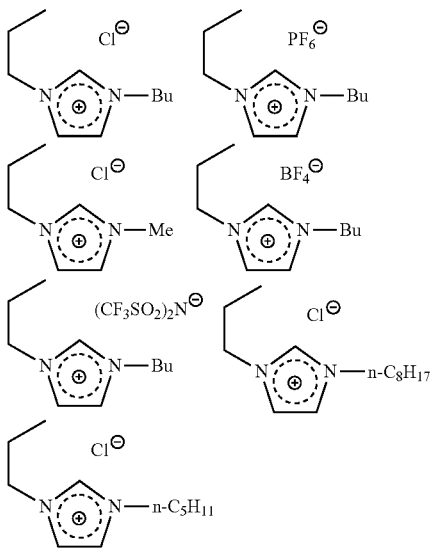

$R^{4g}$ is more preferably a hydrogen atom, or an alkyl group optionally fluorinated or optionally bonded through an ethylene chain, more preferably a hydrogen atom, a methoxyethyl group, an isobutyl group, or $R^{31}$—$CF_2$—$(CF_2)_{s6}$—$(CH_2)_{s7}$—O—$(CH_2)_2$— ($R^x$ is a fluorine atom or a hydrogen atom, s6 is an integer of 0 to 6, and s7 is an integer of 1 to 6), and further preferably a 3-(perfluoroethyl)propoxyethyl group (the rational formula: $CF_3$—$(CF_2)$—$(CH_2)_3$—O—$(CH_2)_2$—).

In the above $R^4$, a structural unit $R^{4a}$ and a structural unit $R^{4b}$ may each form a block or may randomly be bonded to each other.

In the above formulae (B1) and (B2), n1 is an integer of 1 to 100, preferably an integer of 1 to 50, and further preferably an integer of 2 to 30.

In the above formulae (B1) and (B2), $R^5$ represents —O—, —S—, —NH—, or a single bond, preferably —O—.

In the above formulae (B1) and (B2), $R^6$ represents a monovalent organic group or a hydrogen atom.

$R^6$ is preferably Rf-PFPE-$R^2$ (wherein Rf, PFPE, and $R^2$ are as defined above), or an alkyl group having 1 to 10 carbon atoms optionally substituted by fluorine, more preferably an alkyl group having 1 to 6 carbon atoms, further preferably methyl.

In the above formulae (C1), $R^7$ represents an (n2+n3)-valent organic group optionally having a cyclic structure, a hetero atom, and/or a functional group, In the above formula (C1), n2 is an integer of 1 to 3.

In the above formula (C1), n3 is an integer of 1 to 3.

"n2+n3" is preferably 3, for example, 1 for n2 and 2 for n3, or 2 for n2 and 1 for n3.

Examples of the "(n2+n3)-valent organic group optionally having a cyclic structure, a hetero atom, and/or a functional group" in the above $R^7$ include, for example, a group derived by further removing (n2+n3−1) hydrogen atoms from a monovalent organic group.

$R^7$ is preferably a group represented by each of the formulae below.

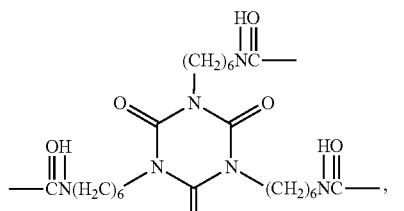

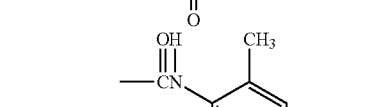

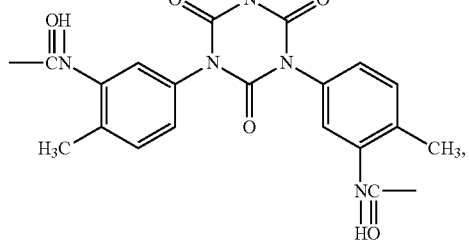

-continued

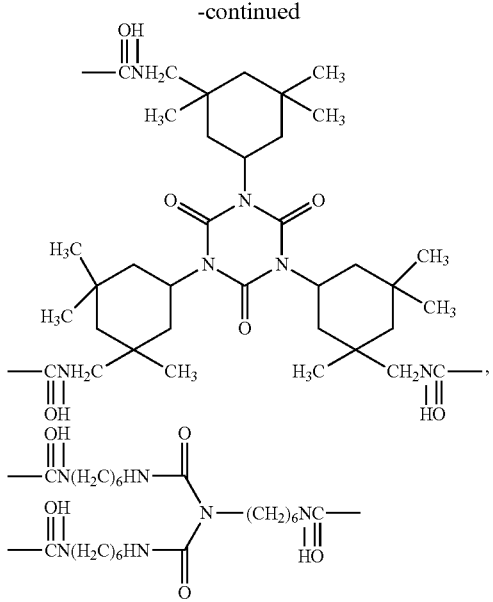

$R^7$ is more preferably a group represented by the formula below.

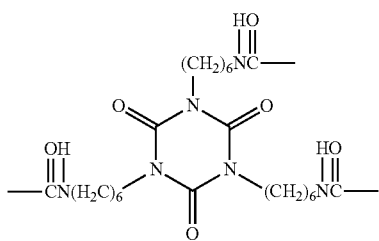

In the above formula (C1), $R^8$ represents a divalent organic group. $R^8$ is preferably —O—$(CH_2)_r$— wherein r is an integer of 1 to 10 and preferably an integer of 1 to 3, —NH—$(CH_2)_r$— wherein r is as defined above, and more preferably —O—$(CH_2)_r$— wherein r is an integer of 1 to 3.

In an embodiment, the compounds represented by the above formulae (B1) and (B2) may each be at least one of compound represented by the general formulae (B1a) and (B2a) below:

wherein Rf, PFPE, $R^3$, $R^6$, $X^1$, Z, and n1 are as defined above,
g is 0 or 1,
h is 1 or 2, and
q1 is an integer of 1 to 5.

In another embodiment, the compound represented by the above formula (C1) is at least one type of compound obtained by reacting with each other:
(a) an NCO group present in triisocyanate formed by trimerizing diisocyanate, (b) at least one type of active hydrogen-containing compound represented by the formula (a1) or the formulae (a1) and (a2) below:

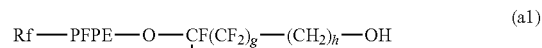 (a1)

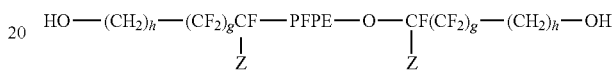 (a2)

[wherein Rf, PFPE, Z, g, and h each have the same meaning as above], and active hydrogen of at least one type of active hydrogen-containing compound represented by the formula (a3) below:

$$CH_2=CX^1C(O)O-R^{30}-OH \qquad (a3)$$

wherein $X_1$ is as defined above, and
$R^{30}$ represents a divalent organic group.

$R^{30}$ in the formula (a3) is preferably —$(CH_2)_{r'}$— wherein r' is an integer of 1 to 10, preferably an integer of 1 to 3, —$CH(CH_3)$—, —$CH(CH_2CH_3)$—, and —$CH(CH_2OC_6H_5)$—, more preferably —$(CH_2)_{r'}$— wherein r' is an integer of 1 to 3.

In the above formula (D1), $R^9$ represents a 3 to 8-valent organic group. As is clear from the formula (D1), $R^9$ is (n4+1)-valent.

Specific examples of $R^9$ include, for example,
—O—$CH_2$—$C(CH_2$—$)_3$; or
—O—$CH_2$—$C(CH_2$—$)_2$—$CH_2OCH_2$—$C(CH_2$—$)_3$.
In a preferred embodiment, examples of $R^9(R^1)_{n4}$ include
—O—$CH_2$—$C(CH_2$—$OC(O)$—$CR^2$=$CH_2)_3$; or
—O—$CH_2$—$C(CH_2$—$OC(O)$—$CR^2$=$CH_2)_2$—
$CH_2OCH_2$—$C(CH_2$—$OC(O)$—$CR^2$=$CH_2)_3$.
In the above formula (D1), n2 is an integer of 1 to 3.
In the above formula (D1), n3 is an integer of 1 to 3.

(B1a)

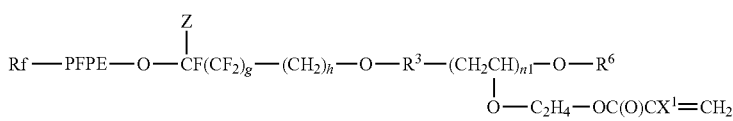

(B2a)

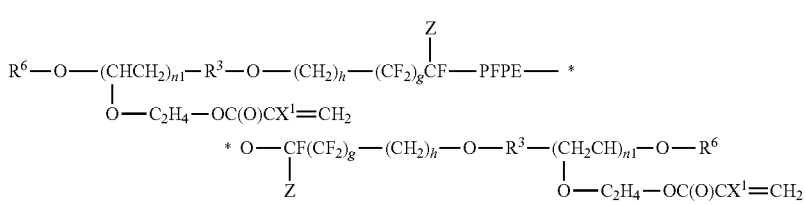

In the above formula (D1), n4 is an integer of 2 to 7 and preferably 3 to 6.

In the above formula (E1), $R^7$ has the same meaning as that in the above (C1). The valence number of $R^7$ in the formula (E1) is (n5+n6+n7)-valent.

In the above formula (E1), $R^{11}$ is —$R^8$—$R^1$ or —$R^9$($R^1$)$_{n4}$. —$R^8$—$R^1$ and —$R^9$($R^1$)$_{n4}$ groups respectively have the same meaning as those in the formula (C1) and the formula (D1).

In the formula (E1), $R^{12}$ is a group containing Si.

The group containing Si may be at least one of compound represented by the formula below.

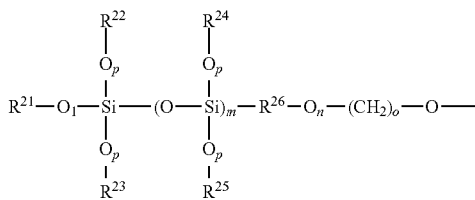

In the above formula, $R^{21}$, $R^{22}$, $R^{23}$, $R^{24}$, and $R^{25}$ are each independently an alkyl group or an aryl group.

Examples of the alkyl group include, but are not particularly limited to, an alkyl group having 1 to 10 carbon atoms and a cycloalkyl group having 3 to 20 carbon atoms, and the alkyl group is preferably an alkyl group having 1 to 6 carbon atoms. The alkyl group may be a straight chain or may be a branch chain and is preferably a straight chain. A preferred specific example is an n-butyl group for $R^{21}$ and a methyl group for each of $R^{22}$ to $R^{25}$.

Examples of the aryl group include, but are not particularly limited to, an aryl group having 6 to 20 carbon atoms. The aryl group may have two or more rings. A preferred aryl group is a phenyl group.

The alkyl group and the aryl group may optionally contain, in its molecular chain or its ring, a hetero atom, for example, a nitrogen atom, an oxygen atom, or a sulfur atom.

The alkyl group and the aryl group may be substituted by halogen; one or more substituent groups selected from a $C_{1-6}$-alkyl group, a $C_{2-6}$-alkenyl group, a $C_{2-6}$-alkynyl group, a $C_{3-10}$-cycloalkyl group, a $C_{3-10}$-unsaturated cycloalkyl group, a 5 to 10 membered heterocyclyl group, a 5 to 10 membered unsaturated heterocyclyl group, a $C_{6-10}$-aryl group, and a 5 to 10 membered heteroaryl group which each may optionally be substituted by one or more halogens.

In the above formula, $R^{26}$ represents a divalent organic group. $R^{26}$ is preferably —(CH$_2$)$_r$— wherein r is an integer of 1 to 20 and preferably an integer of 1 to 10.

In the above formula, 1 and n are each independently 0 or 1; m is an integer of 1 to 500, preferably 1 to 200, more preferably an integer of 5 to 150; o is an integer of 0 to 20 such as, for example, an integer of 1 to 20, and p is 0 or 1.

Exemplary groups represented by the above formula include, for example, the groups below.

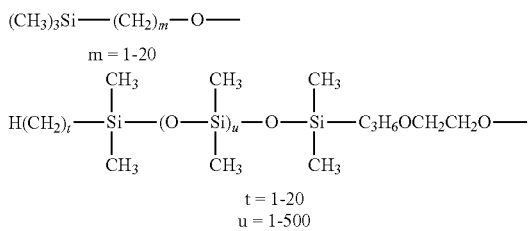

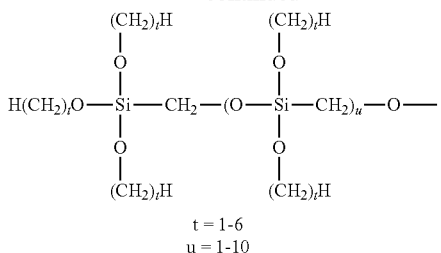

$t = 1-6$
$u = 1-10$

In the above formula (E1), n5 is an integer of 1 to 3.
In the above formula (E1), n6 is an integer of 1 to 3.
In the above formula (E1), n7 is an integer of 1 to 3.

Another example of the fluorine-containing graft compound is a compound represented by

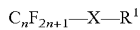

$C_nF_{2n+1}$—X—$R^1$ wherein $R^1$ and X are as defined above, and n is an integer of 1 to 30 and preferably an integer of 3 to 20 such as, for example, an integer of 4 to 10.

Further another fluorine-containing graft compound is a fluorine-containing acrylate ester represented by a formula (I):

wherein X is a hydrogen atom or a methyl group, a fluorine atom, a chlorine atom, a bromine atom, an iodine atom, a $CFX^1X^2$ group ($X^1$ and $X^2$ are each a hydrogen atom, a fluorine atom, a chlorine atom, a bromine atom, or an iodine atom, a cyano group, a straight chain or a branch chain fluoroalkyl group having 1 to 21 carbon atoms, a substituted or an unsubstituted benzyl group, or a substituted or an unsubstituted phenyl group, Y is an aliphatic group having 1 to 10 carbon atoms, an aromatic group or a cycloaliphatic group having 6 to 10 carbon atoms, a —CH$_2$CH$_2$N($R^1$)SO$_2$— group ($R^1$ is an alkyl group having 1 to 4 carbon atoms), or a —CH$_2$CH(OY$^1$)CH$_2$— group ($Y^1$ is a hydrogen atom or an acetyl group), and Rf is a straight chain or a branch chain fluoroaklyl group having 1 to 6 carbon atoms or a fluoroalkenyl group].

In the fluorine-containing acrylate ester, X is preferably a hydrogen atom or a methyl group.

In the formula (I), Rf group is preferably a perfluoroalkyl group or a perfluoroalkenyl group. The number of carbon atoms of each of the fluoroalkyl group and the fluoroalkenyl group is 1 to 6 such as, for example, 1 to 4.

Examples of the fluoroalkyl group include —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF(CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, —(CF$_2$)$_5$CF$_3$, and —(CF$_2$)$_3$CF(CF$_3$)$_2$.

Examples of the fluoroalkenyl group include —CF=CF$_2$, —CF$_2$CF=CF$_2$, —(CF$_2$)$_2$CF=CF$_2$, —CF$_2$C(CF$_3$)=CF$_2$, —CF(CF$_3$)CF=CF$_2$, —(CF$_2$)$_3$CF=CF$_2$, —C(CF$_3$)$_2$CF=CF$_2$, —(CF$_2$)$_2$C(CF$_3$)=CF$_2$, —(CF$_2$)$_4$CF=CF$_2$, —(CF$_2$)$_4$CF=CF$_2$, —(CF$_2$)$_3$C(CF$_3$)=CF$_2$, and the like.

Y is an aliphatic group having 1 to 10 carbon atoms, an aromatic group or a cycloaliphatic group each having 6 to 10 carbon atoms, a —CH$_2$CH$_2$N(R$^1$)SO$_2$— group (R$^1$ is an alkyl group having 1 to 4 carbon atoms), or a —CH$_2$CH(OY$^1$)CH$_2$— group (Y$^1$ is a hydrogen atom or an acetyl group). The aliphatic group is preferably an alkylene group (especially has 1 to 4, for example, 1 or 2 carbon atoms). The aromatic group and the cycloaliphatic group may each be substituted or may be unsubstituted.

Examples of the fluorine-containing graft compound include a fluorine-containing acrylate ester represented by the formulas:

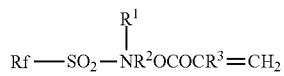   (1)

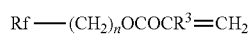   (2)

   (3)

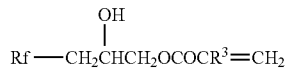   (4)

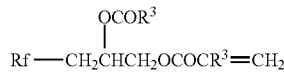   (5)

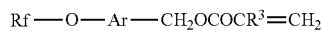   (6)

Wherein Rf is a perfluoroalkyl group having 1 to 6 carbon atoms,

R$^1$ is hydrogen or an alkyl group having 1 to 10 carbon atoms,

R$^2$ is an alkylene group having 1 to 10 carbon atoms,

R$^3$ is a hydrogen atom or a methyl group,

Ar is an aryl group may optionally having a substituent group, and n represents an integer of 1 to 10.

Specific examples of the fluorine-containing graft compound can include
CF$_3$(CF$_2$)$_5$(CH$_2$)OCOCH=CH$_2$,
CF$_3$(CF$_2$)$_5$(CH$_2$)OCOC(CH$_3$)=CH$_2$,
CF$_3$(CF$_2$)$_2$(CH$_2$)OCOCH=CH$_2$,
CF$_3$(CF$_2$)$_7$(CH$_2$)OCOC(CH$_3$)=CH$_2$,
(CF$_3$)$_2$CF(CF$_2$)$_3$(CH$_2$)$_2$OCOCH=CH$_2$,
CF$_3$ (CF$_2$)$_3$(CH$_2$)$_2$OCOC(CH$_3$)=CH$_2$,
CF$_3$(CF$_2$)$_3$(CH$_2$)$_2$OCOCH=CH$_2$,
CF$_3$CF$_2$(CH$_2$)$_2$OCOCH=CH$_2$,
CF$_3$(CF$_2$)$_3$SO$_2$N(CH$_3$)(CH$_2$)$_2$OCOCH=CH$_2$,
CF$_3$(CF$_2$)$_3$SO$_2$N(C$_2$H$_5$)(CH$_2$)$_2$OCOC(CH$_3$)=CH$_2$,
(CF$_3$)$_2$CF(CF$_2$)$_3$CH$_2$CH(OCOCH$_3$)CH$_2$OCOC(CH$_3$)=CH$_2$, and
(CF$_3$)$_2$CF(CF$_2$)$_3$CH$_2$CH(OH)CH$_2$OCOCH=CH$_2$.

In another embodiment, the fluorine-containing graft compound may be a hydrocarbon having an ethylenic double bond whose hydrogen atoms are all or partially substituted by fluorine atoms.

Examples of the compound that is a hydrocarbon having an ethylenic double bond and whose hydrogen atoms are all or partially substituted by fluorine atoms include, for example, ethylene, propylene, and butylene that each are fluorine-substituted and preferably ethylene, propylene, and butylene that each are fully fluorine-substituted. In a preferred embodiment, the compound that is a hydrocarbon having an ethylenic double bond and whose hydrogen atoms are all or partially substituted by fluorine atoms may be tetrafluoroethylene.

The ionizing radiation is not particularly limited as long as the ionizing radiation can generate radicals when the ionizing radiation is applied to the resin material and, for example, an electron beam (a β-ray), an X-ray, a γ-ray, a neutron ray, a UV-ray, plasma, and ion exposure are usable. The electron beam is preferably used because the control of the penetration depth (the range) of the ionizing radiation is easy and the radicals are easily generated in the resin.

The absorbed dose of the applied ionizing radiation is 1 to 1,000 kGy, preferably 10 to 500 kGy, and more preferably 50 to 300 kGy. Any degradation of the resin material in its surface layer can be suppressed to be minimal by setting the absorbed dose to be 1,000 kGy or less. The radicals can be generated in an amount sufficient for the surface graft polymerization by setting the absorbed dose to be 1 kGy or more. The energy absorption amount of the resin material can be measured using a scintillation detector or a semiconductor detector while the energy absorption amount can be detected by more preferably, for example, a cellulose triacetate (CTA) film dosemeter or a radiochromic film dosemeter.

When an electron beam is used, the energy of the electron of the electron beam applied to the resin material is preferably 5 keV to 10,000 keV, more preferably 10 keV to 1,000 keV, further preferably 30 keV to 100 keV, and further more preferably 40 keV to 70 keV on the surface of the resin material. The electron beam is absorbed substantially only in the vicinity of the surface of the resin material and the electron beam penetrating up to the inside of the base material is reduced by setting the energy of the electron on the surface of the resin material to be 100 keV or lower, and any degradation of the resin material caused by the electron beam can be suppressed. In addition, absorption of the electron beam is little in the inside of the resin that does not engage the surface graft polymerization, the electron beam penetrating the resin material is little, and the energy absorption efficiency can therefore be also increased. On the other hand, the radicals substantially sufficient for the surface graft polymerization can be generated on the surface of the resin material by setting the energy of the electron on the surface of the resin material to be 5 keV or higher.

In the case where an electron beam from an electron accelerator is used, when the section from the electron gun to the resin material is in a vacuum environment, the energy of the electron is proportional to the acceleration voltage and the acceleration voltage only has to be preferably 5 to 10,000 kV, more preferably 10 to 1,000 kV, further preferably 30 to 100 kV, and further more preferably 40 to 70 kV.

For example, in the case where the acceleration voltage of the electron beam is 60 kV, the depth of reach of the electron beam may be about 60 µm when the molding material to which the electron beam is applied is a non-fluorine resin, and may be about 30 µm when the molding material to which the electron beam is applied is a fluorine resin.

On the other hand, in the case where such an electron accelerator is used as that having an application window for extraction into the atmospheric air present between the electron gun and the sample (that is, the resin material), even when the application is conducted in a vacuum, the energy of the electron is attenuated during the passage through the application window and the acceleration voltage therefore needs to be further increased corresponding to the attenuation of the energy of the electron. When the electron passes through a nitrogen gas flow, similarly, the acceleration voltage surely needs to be increased taking into consideration the energy attenuated corresponding to the density and the distance of the gas flow up to the resin material.

When the electron beam is used, the exposure dose of the electron applied to the resin material is 10 $\mu C/cm^2$ to 10 $mC/cm^2$, preferably 50 $\mu C/cm^2$ to 1 $mC/cm^2$, and more preferably 100 $\mu C/cm^2$ to 300 $\mu C/cm^2$ such as, for example, 200 $\mu C/cm^2$. The radicals can efficiently be generated by setting the exposure dose to be in the above ranges.

From the viewpoint of suppression of the pair annihilation of the generated radicals, the application of the ionizing radiation to the resin material is conducted in preferably an atmosphere having substantially no oxygen present therein, for example, an atmosphere whose oxygen concentration is, for example, 1,000 ppm or lower, more preferably 500 ppm or lower, and further more preferably 100 ppm or lower. For example, the application of the ionizing radiation is conducted in a vacuum or in an inert gas atmosphere such as, for example, in a nitrogen atmosphere or an argon atmosphere. The "vacuum" does not need to be the complete vacuum, only has to be a substantial vacuum, and may be, for example, both of a rough vacuum of about $10^3$ Pa and a high vacuum of about $10^{-2}$ Pa. In another embodiment, the application of the ionizing radiation may be conducted in the atmospheric air to obtain peroxidized radicals, and oxygen can be supplied after the generation of the radicals. To prevent any deactivation of the radicals generated in the resin material, the resin material after the application is preferably stored at a low temperature equal to or lower than the glass transition point of the polymer constituting this resin and is more preferably stored in the vacuum or an inert atmosphere.

The penetration depth of the ionizing radiation is preferably 0.001 to 99% such as, for example, 0.01 to 99%, 0.1 to 99%, or 0.2 to 99%, more preferably 1.0 to 95%, further more preferably 3 to 90% such as for example, 5 to 80%, 10 to 60%, or 20 to 60% of the thickness of the resin material. For example, the penetration depth of the ionizing radiation may be a depth up to 0.2 to 20 mm, up to 0.2 to 1 mm, or up to 0.2 to 500 $\mu m$, preferably up to 0.2 to 200 $\mu m$, more preferably up to 1 to 100 $\mu m$, further preferably up to 2 to 60 $\mu m$, and further more preferably up to 3 to 50 $\mu m$ such as, for example, up to 5 to 50 $\mu m$, or up to 10 to 50 $\mu m$ from the surface of the resin material.

The "penetration depth of the ionizing radiation" means the depth up to which the resin material absorbs the energy of the ionizing radiation. The penetration depth of the ionizing radiation is substantially same as the region that has the surface graft polymerization taking place therein while the surface of the resin material is slightly swollen by the surface graft reaction and the depth at which the graft chains are present of the molding material after the graft reaction may be deeper than the penetration depth of the ionizing radiation.

The graft polymerization of the radicals generated in the resin material and the fluorine-containing graft compound is conducted by bringing the radicals in the resin material generated by applying thereto the ionizing radiation and the fluorine-containing graft compound into contact with each other. The radicals in the resin material and the fluorine-containing graft compound are brought into contact with each other by, for example, immersing the resin material in a solution of the fluorine-containing graft compound, dropping in droplets or applying the fluorine-containing graft compound to the resin material, or putting the resin material in the presence of the fluorine-containing graft compound in a gas form. Even when the wettability between the surface of the resin material and the fluorine-containing graft compound is low, it is preferred that the resin material be immersed in a solution of the fluorine-containing graft compound because uniform and reliably contact is enabled.

The reaction temperature of the graft polymerization is not particularly limited and is, for example, the room temperature to 100° C., preferably 30 to 80° C., more preferably 30 to 60° C.

The reaction time period of the graft polymerization is not particularly limited and is, for example, 30 minutes to 32 hours, preferably 1 to 12 hours, and more preferably 2 to 6 hours.

As above, the graft polymerization can be conducted by applying the ionizing radiation to the resin material and thereafter bringing the resin material and the fluorine-containing graft compound into contact with each other while the graft polymerization is not limited to this. The resin material and the fluorine-containing graft compound may be brought into contact with each other simultaneously with the application of the ionizing radiation. For example, the ionizing radiation may be applied to the resin material in the state where the resin material is immersed in a solution of the fluorine-containing graft compound or in an atmosphere in the presence of the fluorine-containing graft compound in a gas form. The resin material and the fluorine-containing graft compound may in advance be brought into contact with each other and, in this state, the ionizing radiation may be applied thereto. For example, the fluorine-containing graft compound may be dropped in droplets, applied, or the like to be present on the resin material and the ionizing radiation may be applied thereto.

In the present invention, a molded article is obtained by molding the above molding material.

The method for molding the molding material into a molded article is not particularly limited and any ordinary molding method is usable, for example, extrusion molding, injection molding, press molding, vacuum molding, or transfer molding, and extrusion molding is preferably used.

The temperature for the molding can appropriately be selected in accordance with the type of the used resin material, and may be a temperature equal to the glass transition point or higher and equal to the decomposition temperature or lower, preferably a temperature equal to the melting point or higher and equal to the decomposition temperature or lower.

The shape of the obtained molded article is not particularly limited and may be any desired shape, for example, a block-like shape, a sheet-like shape, a film-like shape, a bar-like shape, or any one of various shapes each in accordance with the use.

According to the present invention, a molded article can be obtained that has a higher degree of transparency and a smoother surface than those of a molded article obtained by the traditional method of adding the fluorine repellent agent and the like when the molding is conducted, by using the molding material that includes the graft chains.

For example, the obtained molded article may have the haze value of, for example, 2.0% or lower, preferably 1.0% or lower, and more preferably 0.30% or lower. The haze value can be measured using a commercially available haze meter.

According to the method of the present invention, a molded article having the excellent functions originated from the graft chains (for example, the water repellency and the oil repellency) can be obtained by using the molding material having the graft chains even when the molding is conducted in the same manner as the traditional manner, for example, when the molding is conducted using a molding material having the same shape as that of the conventional molding material (for example, a pellet material) and using the traditional molding method (for example, injection molding or extrusion molding). According to the present invention, the functions can more easily be imparted to the molded article than grafting the surface of the molded article after the molding.

As above, the method of the present invention is characterized in that the molding material having fluorine-containing graft chains is used. The present invention also provides the molding material having the fluorine-containing graft chains.

In an embodiment, the molding material of the present invention may include the resin material having the graft chains, the fluorine-containing graft chains may be present up to the depth of 200 μm at the maximum from the surface of the molding material, and the surface area thereof may be 100 mm$^2$ or smaller.

EXAMPLES

Example 1

A low-energy electron beam was applied to the surface of a pellet (2 mm×2 mm×5 mm) of a thermoplastic resin, a cycloolefin polymer (COP) as the resin material at the exposure dose of 20 kGy in a nitrogen atmosphere (the application conditions: the acceleration voltage of 250 kV, the application current of 1 mA, and the specimen-application window distance of 15 mm) using an electron beam irradiation apparatus. The pellet was taken out and was put in a container in a nitrogen atmosphere to be immersed in a $C_6F_{13}CH_2CH_2OCOCH=CH_2$ (for which deoxidization treatment was conducted in advance) solution as the fluorine-containing graft compound at the internal temperature of 60° C. for 4 hours. After the immersion, the pellet was washed with acetone and was dried to acquire a molding material (a raw material pellet) having graft chains each including perfluoroalkyl group ($C_6F_{13}$—).

The pellet obtained as above was heated to be melted at 260° C. and was film-molded at an increased pressure of 0.0136 MPa to obtain a film having a thickness of 0.5 mm.

Examples 2 to 18

The molding material (a raw material pellet) and a film were produced using the same method as that of Example 1 except the fact that the resin material and the perfluoroalkyl group of the fluorine-containing graft compound were changed and the exposure dose was varied as shown in Table 1.

TABLE 1

| | Resin Material | Perfluoroalkyl Group of Fluorine-Containing Graft Compound | Exposure Dose (kGy) |
|---|---|---|---|
| Example 1 | COP | $C_6F_{13}$— | 20 |
| Example 2 | COP | $C_6F_{13}$— | 150 |
| Example 3 | COP | $C_6F_{13}$— | 300 |
| Example 4 | COP | $C_4F_9$— | 20 |
| Example 5 | COP | $C_4F_9$— | 150 |
| Example 6 | COP | $C_4F_9$— | 300 |
| Example 7 | COP | $C_8F_{17}$— | 20 |
| Example 8 | COP | $C_8F_{17}$— | 150 |
| Example 9 | COP | $C_8F_{17}$— | 300 |
| Example 10 | PP | $C_6F_{13}$— | 20 |
| Example 11 | PP | $C_6F_{13}$— | 150 |
| Example 12 | PP | $C_6F_{13}$— | 300 |
| Example 13 | PP | $C_4F_9$— | 20 |
| Example 14 | PP | $C_4F_9$— | 150 |
| Example 15 | PP | $C_4F_9$— | 300 |
| Example 16 | PP | $C_8F_{17}$— | 20 |
| Example 17 | PP | $C_8F_{17}$— | 150 |
| Example 18 | PP | $C_8F_{17}$— | 300 |
| Comparative Example 1 | COP | — | — |
| Comparative Example 2 | COP | — | — |
| Comparative Example 3 | PP | — | — |
| Comparative Example 4 | PP | — | — |

*COP: A cycloolefin polymer
*PP: Polypropylene

Comparative Example, 1

A film was produced in the same manner as that of Example 1 except using an untreated pellet without conducting the electron beam treatment and the graft polymerization.

Comparative Example 2

A film was molded in the same manner as that of Comparative Example 1 except the fact that a fluorine-based repellent agent (a copolymer of $C_6F_{13}CH_2CH_2OCOCH=CH_2$ (C6SFA) and $C_{18}H_{37}OCOCH=CH_2$ (StA), C6SFA/StA=40/60 (% by weight)) was added to the pellet when the film was molded, Comparative Example 3

A film was molded in the same manner as that of Comparative Example 1 except the fact that PP was used instead of COP.

Comparative Example 4

A film was molded in the same manner as that of Comparative Example 3 except the fact that a fluorine-based repellent agent (a copolymer of $C_6F_{13}CH_2CH_2OCOCH=CH_2$ (C6SFA) and $C_{18}H_{37}OCOCH=CH_2$ (StA), C6SFA/StA=40/60 (% by weight)) was added to the pellet when the film was molded,

TEST EXAMPLE

Confirmation of Graft Chains
For each of the molding materials (the raw material pellets) obtained in Examples 1 to 18, the distribution of fluorine in the surface of a cross-sectional segment was measured using a scanning transmission electron microscope (STEM: manufactured by JEOL Ltd.) and it was thereby confirmed that the graft chains were present spanning from the surface up to a depth of 20 μm.

Measurement of Graft Ratio
For each of the raw material pellets obtained in Examples 1 to 18, the pellet to be the resin material before the graft polymerization (the initial weight) and the weight of the pellet to be the molding material after the graft polymerization (the weight after the grafting) were measured and the graft ratio was determined from the equation below. The result thereof is shown in Table 2 below.

Graft Ratio (%)=((the weight after the grafting–the initial weight)/the initial weight)×100

Measurement of Angle of Contact

For each of the films obtained in Examples 1 to 18 and Comparative Example 1, the initial angle of contact for each of water and n-hexadecane was measured at the room temperature. For example, the initial angle of static contact was conducted for 2 μL of each of water and n-hexadecane using an angle-of-contact measuring apparatus (manufactured by Kyowa Interface Science Co., Ltd.). The result thereof is shown in Table 2 below.

Evaluation of Outer Appearance

For each of the films obtained in Examples 1 to 18 and Comparative Examples 1 to 4, the outer appearance was evaluated. The evaluation criteria were as follows and the result thereof is shown in Table 2.

Evaluation Criteria
○: Transparent and uniform
Δ: With white turbidity
x: No mixing observed

TABLE 2

| | | Angle of Contact (°) | | |
|---|---|---|---|---|
| | Graft Ratio (%) | Water | n-hexadecane | Outer Appearance |
| Example 1 | 0.09 | 101 | 17 | ○ |
| Example 2 | 0.29 | 105 | 60 | ○ |
| Example 3 | 0.12 | 104 | 53 | ○ |
| Example 4 | 0.06 | 101 | 21 | ○ |
| Example 5 | 0.17 | 100 | 40 | ○ |
| Example 6 | 0.08 | 95 | 33 | ○ |
| Example 7 | 0.09 | 106 | 25 | ○ |
| Example 8 | 0.23 | 105 | 40 | ○ |
| Example 9 | 0.29 | 95 | 30 | ○ |
| Example 10 | 0.04 | 106 | 27 | ○ |
| Example 11 | 0.19 | 106 | 43 | ○ |
| Example 12 | 0.07 | 105 | 29 | ○ |
| Example 13 | 0.07 | 101 | 18 | ○ |
| Example 14 | 0.07 | 107 | 32 | ○ |
| Example 15 | 0.70 | 107 | 51 | ○ |
| Example 16 | 0.002 | 105 | 21 | ○ |
| Example 17 | 0.01 | 102 | 28 | ○ |
| Example 18 | 0.01 | 99 | 16 | ○ |
| Comparative Example 1 | — | 84 | 7 | ○ |
| Comparative Example 2 | — | 99 | 14 | x |
| Comparative Example 3 | — | 102 | 10 | ○ |
| Comparative Example 4 | — | 106 | 24 | Δ |

From the above results, it was confirmed that the surface graft polymerization caused by the application of the electron beam was advanced in each of the molding materials obtained in Examples (the raw material pellets). It was confirmed that the film molded from each of the molding materials obtained in Examples (the pellets) was excellent in the outer appearance and developed the water repellency and the oil repellency.

INDUSTRIAL APPLICABILITY

The method of the present invention is usable for producing various types of molded article to which the oil repellency, the water repellency, and the like are required, such as, for example, a medical syringe barrel, a vial container, a contact mold, a surface protection film for a mobile terminal, containers and packaging members related to daily life, a drainage conduit member used in a bath room, and a string material for clothing including a synthetic chemical material. The method of the present invention is usable for producing not only the molded articles to which the oil repellency and the water repellency are required, but also molded articles to which the slipperiness and the mold release durability are required such as, for example, surface members for a watch strap, a display element, and the like. In addition, the method is also usable for producing household products, stationery products, interior decorating materials, sanitary products, medical products, and the like. Furthermore, because molded articles each having low surface energy can be produced using the method and the method is therefore also usable for producing a molded article as a water repellent coating to be bonded to a side wall or a roof of a construction.

The invention claimed is:

1. A method for producing a molded article from a molding material wherein the molding material comprises a resin material having a fluorine-containing graft chain on the resin material,
    the molding material is a pellet or powder,
    the resin material is a non-fluorine resin selected from the group consisting of polyolefin-based resins, polyvinyl chloride-based resins, acrylic resins, polyesters, polyether, polyether ketone, polyetherether ketone, polyetherimide, polyacetal, polyphenyleneoxide, modified polyphenyleneoxide, polyarylate, aromatic polyesters, styrene-based resins, polyurethane-based resins, chlorinated polyethylene-based resins, epoxy resins, phenol resins, urea resins, melamine resins, unsaturated polyesters, silicone resins, polydimethyl silicone and polyurethane, or copolymers, blends, or polymer alloys thereof, and the depth at which the fluorine-containing graft chain is present is a depth up to 0.001 to 99% of the thickness of the molding material from the surface of the molding material, and
    wherein the method comprising applying an ionizing radiation to the resin material in pellet or powder form, then reacting the resin material with a fluorine-containing graft compound to obtain the molding material, and then molding the molding material to form the molded article.

2. The method according to claim 1 wherein the molding material is a pellet.

3. The method according to claim 1 wherein the molding material is powder.

4. A molding material for a fluorine-containing molded article comprising a resin material having a graft chain on the resin material, wherein
    the molding material is a pellet or powder,
    the resin material is a non-fluorine resin selected from the group consisting of polyethylene, polypropylene, ethylene-propylene copolymer, ethylene-vinyl acetate copolymer, polyvinyl chloride-based resins, acrylic resins, polyesters, polyether, polyether ketone, polyetherether ketone, polyetherimide, polyacetal, polyphenyleneoxide, modified polyphenyleneoxide, polyarylate, aromatic polyesters, styrene-based resins, polyurethane-based resins, chlorinated polyethylene-based resins, epoxy resins, phenol resins, urea resins, melamine resins, unsaturated polyesters, silicone resins, polydimethyl silicone and polyurethane, or copolymers, blends, or polymer alloys thereof, and the depth at which the fluorine-containing graft chain is present is a depth up to 0.001 to 99% of the thickness of the molding material from the surface of the molding material.

5. The molding material according to claim 4 wherein the molding material is a pellet.

6. The molding material according to claim 4 wherein the molding material is powder.

7. The method according to claim 1 wherein the molding material is a pellet.

8. The method according to claim 1 wherein the molding material is powder.

9. The method according to claim 1, wherein a graft ratio of the graft chain introduced into the resin material is 0.10 to 5.0%.

10. The molding material according to claim 4, wherein a graft ratio of the graft chain introduced into the resin material is 0.10 to 5.0%.

11. The method according to claim 1, wherein the resin material is selected from the group consisting of polyethylene, polypropylene, ethylene-propylene copolymer, ethylene-vinyl acetate copolymer, modified polyolefin and polyvinyl chloride, polyvinylidene chloride, polystyrene, polyamide, polyimide, polyamideimide, polycarbonate, poly-(4-methylpentene-1), ionomer, polymethylmethacrylate, acryl-styrene copolymer, butadiene-styrene copolymer, ethylene-vinyl alcohol copolymer, polyethylene terephthalate, polybutylene terephthalate, polycyclohexane terephthalate, polyether, polyether ketone, polyetherether ketone, polyetherimide, polyacetal, polyphenyleneoxide, modified polyphenyleneoxide, polyarylate, liquid crystal aromatic polyesters, styrene-based resins, polyurethane-based resins, chlorinated polyethylene-based resins, epoxy resins, phenol resins, urea resins, melamine resins, unsaturated polyesters, silicone resins, polydimethyl silicone and polyurethane, or copolymers, blends, or polymer alloys thereof.

12. The molding material according to claim 4, wherein the resin material is selected from the group consisting of polyethylene, polypropylene, ethylene-propylene copolymer, ethylene-vinyl acetate copolymer, modified polyolefin and polyvinyl chloride, polyvinylidene chloride, polystyrene, polyamide, polyimide, polyamideimide, polycarbonate, poly-(4-methylpentene-1), ionomer, polymethylmethacrylate, acryl-styrene copolymer, butadiene-styrene copolymer, ethylene-vinyl alcohol copolymer, polyethylene terephthalate, polybutylene terephthalate, polycyclohexane terephthalate, polyether, polyether ketone, polyetherether ketone, polyetherimide, polyacetal, polyphenyleneoxide, modified polyphenyleneoxide, polyarylate, liquid crystal aromatic polyesters, styrene-based resins, polyurethane-based resins, chlorinated polyethylene-based resins, epoxy resins, phenol resins, urea resins, melamine resins, unsaturated polyesters, silicone resins, polydimethyl silicone and polyurethane, or copolymers, blends, or polymer alloys thereof.

13. The molding material according to claim 4 wherein the fluorine-containing graft chain is not present at a remaining depth of the thickness of the molding material from where the fluorine-containing graft chain is present.

\* \* \* \* \*